Figures 1, 2:
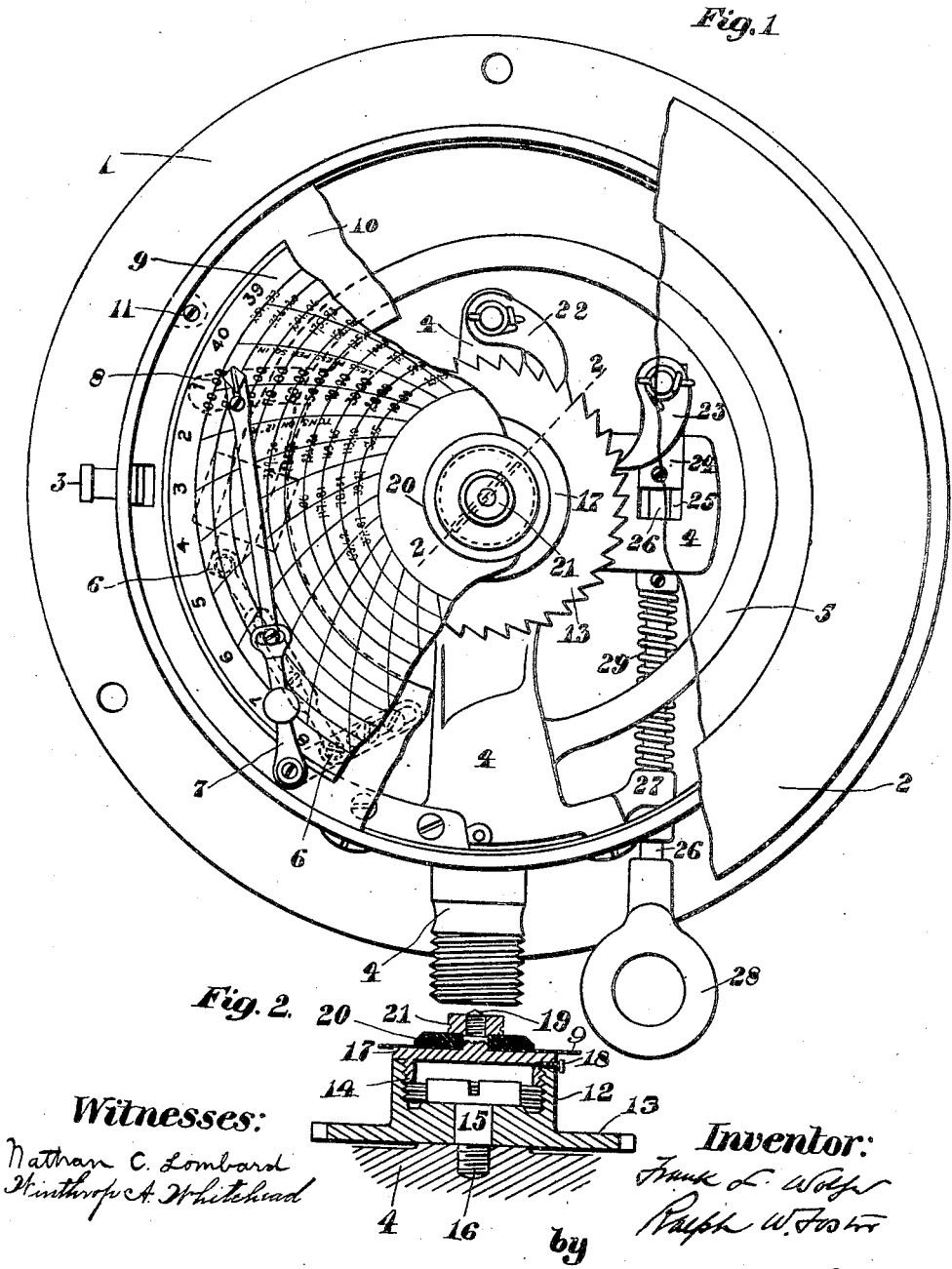

No. 829,614.  
PATENTED AUG. 28, 1906.

F. L. WOLFE.  
PRESSURE RECORDER.  
APPLICATION FILED MAR. 6, 1905.

Witnesses:  
Nathan C. Lombard  
Winthrop A. Whitehead

Inventor:  
Frank L. Wolfe  
Ralph W. Foster  
by  
Atty.

UNITED STATES PATENT OFFICE.

FRANK L. WOLFE, OF MEDFORD, MASSACHUSETTS, ASSIGNOR TO CROSBY STEAM GAGE AND VALVE COMPANY, OF BOSTON, MASSACHUSETTS, A CORPORATION OF MASSACHUSETTS.

PRESSURE-RECORDER.

No. 829,614.　　　　　Specification of Letters Patent.　　　　Patented Aug. 28, 1906.

Application filed March 6, 1905. Serial No. 248,444.

*To all whom it may concern:*

Be it known that I, FRANK L. WOLFE, a citizen of the United States, and a resident of Medford, in the county of Middlesex and State of Massachusetts, have invented certain new and useful Improvements in Pressure-Recorders, of which the following is a specification.

My invention relates to pressure-recorders, more particularly to the charts employed with such recorders; and its object is to provide for rotating such charts at will.

I attain the object by making the rotary platform upon which the chart rests with a ratchet-wheel operated by two spring-pawls, one of which is operated by hand.

The invention is illustrated by the accompanying drawings, in which—

Figure 1 is a plan view of a pressure-recorder with portions broken away and portions in dotted lines. Fig. 2 is a section on the line 2 2, Fig. 1.

Similar numerals refer to similar parts in the two drawings.

The illustrations show a pressure-gage recorder with the gage-case 1, glass cover 2, (partly broken away,) and spring-catch 3. The gage-case and all the parts of the structure are affixed to the gage-socket 4. The Bourdon-tube spring 5 (partly in dotted lines) is affixed at its inner end to the gage-socket and has attached to its free outer end the linkage 6, (dotted lines,) which operates the pen-arm 7, carrying the pen 8. This arrangement is fully described in my Patent of December 24, 1901, No. 689,529, but forms no part of my present invention.

The chart 9 (partly broken away) rests upon the outer annular support 10, (partly broken away,) affixed by screws 11 to lugs in the gage-case and gage-socket and also upon a central support. This central support is a hub 12, having its base 13 in the form of a ratchet-wheel and having its upper portion 14 interiorly threaded. It rests upon the gage-socket 4 and is rotatable about the axis 15, which is a bolt threaded at its lower end 16 for engagement with the gage-socket. The threaded cap 17 is held in place by the dowel-screw 18. This cap forms the immediate support for the chart, which has a central aperture adapted to encircle the threaded stud 19 and which is held in place by the rubber washer 20 and the nut 21. I employ the spring-pawls 22 and 23 to rotate the hub 12. The pawl 22 is mounted on the gage-socket 4. The pawl 23 is mounted on a sliding box 24, which slides in the slot 25 in the gage-socket and is operated by the rod 26, having a bearing 27 in the gage-socket extending through the case 1, and having the handle 28. The counteracting-spring 29 is arranged on the rod 26. With this arrangement each outward movement of the rod rotates the hub 12, and the hub is rotatable in one direction only and but one tooth at a time. When the rod is released, the spring 29 carries the pawl 23 to the next tooth.

This machine enables the operator to rotate the chart at will at such intervals and as far as he may desire. It is of particular value when a series of operations are being recorded—as, for instance, when a lot of car-wheels are being pressed upon their axles and the pressure used in each instance is to be recorded. This machine enables the operator to record the pressure in one instance and then when he is ready rotate the chart and go ahead with the next without opening the gage-case and without removing the chart and inserting a new one. The case may be locked and distinct and accurate records of each operation kept without opening the gage-case. The chart is divided into equal spaces included between curved radial lines and numbered on the margin equal in number to the number of teeth in the ratchet and is rotated one space at each downward movement of the sliding bar. The chart is arranged so that the pen will follow such radial lines.

Having described my invention, what I claim, and desire to secure by Letters Patent, is—

1. In a pressure-recording gage the combination, with the gage mechanism, pen and chart, of a rotatable chart-support comprising a ratchet-hub and a spring-pallet with means independent of the pen for moving said pallet by hand; substantially as described.

2. In a pressure-recording gage the combination, with the gage-case, gage mechanism, pen and chart, of a rotatable chart-support comprising a ratchet-hub and a spring-pallet with means independent of the pen for moving said pallet extending through the case and operative from the outside of the case; substantially as described.

3. In a pressure-recording gage the combination, with the gage mechanism, of a pen, a chart and a rotary chart-support, said support comprising a ratchet-hub, said chart being divided by radial lines into equal spaces equal in number to the number of ratchet-teeth, together with means for rotating said ratchet-hub; substantially as described.

4. In a pressure-recording gage the combination, with the gage mechanism, of a pen, a chart and a rotary chart-support, said support comprising a ratchet-hub, said chart being divided by radial lines into equal spaces equal in number to the number of ratchet-teeth, together with means independent of said pen for rotating said ratchet-hub; substantially as described.

In testimony whereof I have affixed my signature in presence of two witnesses.

FRANK L. WOLFE.

Witnesses:
RALPH W. FOSTER,
EDWARD C. BATES.